US012416715B2

(12) United States Patent
Sotgiu

(10) Patent No.: US 12,416,715 B2
(45) Date of Patent: Sep. 16, 2025

(54) METHOD AND APPARATUS FOR DETERMINING THE GEOMETRICAL DIMENSIONS OF A WHEEL

(71) Applicant: Snap-on Equipment Srl a unico socio, Correggio (IT)

(72) Inventor: Paolo Sotgiu, Modena (IT)

(73) Assignee: Snap-on Equipment Srl a unico socio, Correggio (IT)

( * ) Notice: Subject to any disclaimer, the term of this patent is extended or adjusted under 35 U.S.C. 154(b) by 518 days.

(21) Appl. No.: 17/865,529

(22) Filed: Jul. 15, 2022

(65) Prior Publication Data

US 2023/0024449 A1    Jan. 26, 2023

(30) Foreign Application Priority Data

Jul. 16, 2021    (IT) .......................... 102021000018713

(51) Int. Cl.
*G01S 13/42*    (2006.01)
(52) U.S. Cl.
CPC ................................. *G01S 13/426* (2013.01)
(58) Field of Classification Search
CPC .................................................... G01S 13/426
See application file for complete search history.

(56) References Cited

U.S. PATENT DOCUMENTS

| 5,606,127 | A  |   | 2/1997  | Humber    |            |
|-----------|----|---|---------|-----------|------------|
| 9,212,964 | B2 | * | 12/2015 | Braghiroli| G01M 17/025|
| 2009/0033949 | A1 | * | 2/2009 | Braghiroli | G01M 17/027 |
| | | | | | 356/635 |
| 2011/0208476 | A1 | * | 8/2011 | Braghiroli | G01B 17/06 |
| | | | | | 702/155 |
| 2013/0025372 | A1 |   | 1/2013 | Ye et al. | |
| 2022/0258548 | A1 | * | 8/2022 | Nordmeyer | G01S 13/06 |

FOREIGN PATENT DOCUMENTS

| DE | 102015010953 A1 |   | 3/2017  | |
|----|-----------------|---|---------|-|
| EP | 0358496 A2      |   | 3/1990  | |
| EP | 2060895 A1      |   | 5/2009  | |
| EP | 2360461 A1      |   | 8/2011  | |
| WO | WO-03089876 A1  | * | 10/2003 | G01B 11/275 |
| WO | 2019050799 A1   |   | 3/2019  | |

OTHER PUBLICATIONS

The Extended European Search Report issued by the European Patent Office on Dec. 12, 2022, which corresponds to EP Application No. 22185304.7 and is related to U.S. Appl. No. 17/865,529.

* cited by examiner

*Primary Examiner* — Marcus E Windrich
(74) *Attorney, Agent, or Firm* — Studebaker Brackett PLLC

(57) ABSTRACT

A method and related apparatus are provided for determining the geometrical dimensions of a wheel, or at least one part of a wheel, with particular reference to vehicle wheels, in the context of a wheel maintenance process. The method uses contactless sensors which include a scanning radar system, preferably a millimeter-wave radar system, to scan the wheel, or at least one part of the wheel, quickly and accurately, moving the contactless sensors along a trajectory lying in at least one plane perpendicular to a central axis of the wheel.

20 Claims, 2 Drawing Sheets

METHOD AND APPARATUS FOR DETERMINING THE GEOMETRICAL DIMENSIONS OF A WHEEL

FIELD OF THE INVENTION

The present invention relates to a method for determining the geometrical dimensions of a wheel, or at least one part of a wheel, with particular reference to vehicle wheels, in the context of a wheel maintenance process. The present invention also relates to an apparatus for implementing the above mentioned method.

PRIOR ART

The wheels of vehicles are generally composed of a rim and a tire mounted on it.

In the context of wheel maintenance operations, for example operations involving mounting the tire on the rim or demounting the tire from the rim, or wheel balancing operations, it is often advantageous to determine the geometrical dimensions of the wheel, or at least a portion of the wheel.

Over time, various solutions have been disclosed in this regard.

For example, EP 0 358 496 A2 discloses the use of ultrasonic sensors to measure the dimensions of a wheel, in particular a vehicle wheel. These sensors analyze the surface of the wheel or a part of the surface of the wheel. The ultrasonic sensors are mounted on a rotary element and, during the measurement, are rotated about an axis of rotation by means of the rotary element. A rotary potentiometer, connected to the rotary element, is used to detect the angular position thereof.

U.S. Pat. No. 5,606,127 describes a wheel balancer which comprises a rotary detection element for measuring the dimensions of a wheel to be balanced.

EP 2 060 895 A1 describes a wheel balancer having a wheel protector provided with an ultrasonic sensor, for determining the geometrical dimensions of the wheel.

EP 2 360 461 A1 discloses a wheel balancer having a sensor device mounted on the wheel protector, comprising optical or ultrasonic sensors, for determining the geometrical dimensions of the wheel. The angular position of the sensor device, with respect to the wheel mounted on the shaft of the wheel balancer, is determined by means of accelerometers integrated in said sensor device.

US 2013/0025372 A1 describes a wheel balancer having a sonar sensor mounted on the wheel protector that can detect some geometrical characteristics of the wheel, in particular the interface between the rim and the tire.

WO 2019/050799 A1 discloses a wheel balancer having a laser sensor mounted on the wheel protector, for determining the geometrical dimensions of the wheel.

However, the known solutions have drawbacks. Specifically, various types of sensor are used to determine the geometrical dimensions of a wheel.

The performance of sensors based on sound waves (for example ultrasonic sensors) is generally limited by the speed at which the sound waves travel through the air. Therefore, the wheel protector on which these sensors are often mounted cannot be lowered too quickly, otherwise the sensor may be unable to scan the wheel or wheel portion properly. Likewise, when this type of sensor is used for determining wheel runout, or for verifying that the wheel is centered, this slowness does not allow a high number of samples to be obtained per revolution of the wheel.

Even optical sensors (typically laser sensors) pose problems. This type of sensor is theoretically much faster than sensors based on sound waves, being in theory limited by the speed of light. However, even without taking account of the times necessary to process the signal, these sensors are sensitive to environmental conditions and therefore need a certain exposure time. In general, adverse environmental conditions and particular types of material being scanned can cause delays or scanning errors in optical sensors.

OBJECT OF THE INVENTION

The Applicant therefore aims to overcome the limitations and problems encountered with known solutions.

It is thus an aim of the invention to propose a method, and a related apparatus, that can determine the geometrical dimensions of a wheel, or at least one part of a wheel, with particular reference to vehicle wheels, in the context of a wheel maintenance process, which makes it possible to scan the wheel, or part of the wheel, quickly and accurately.

The present invention also aims to provide a method, and a related apparatus, for scanning a wheel or a part thereof, in the context of a wheel maintenance process, correctly and without errors due, for example, to the characteristics of the sensor used, in relation to the speed at which scanning is performed and/or to the environmental conditions.

The present invention also aims to provide a method, and a related apparatus, for scanning a wheel or a part thereof, in the context of a wheel maintenance process, which makes it possible to obtain a high number of samples, or scans, per unit time, for example with reference to a complete revolution of the wheel.

The present invention also aims to provide a method, and a related apparatus, for scanning a wheel or a part thereof, in the context of a wheel maintenance process, which reduces the time taken to process the scanning signal.

The present invention also aims to provide a method, and a related apparatus, for scanning a wheel or a part thereof, in the context of a wheel maintenance process, which reduces or eliminates sensor exposure times.

The present invention also aims to provide a method, and a related apparatus, for scanning a wheel or a part thereof, in the context of a wheel maintenance process, which is reliable, robust and inexpensive.

These and other aims of the present invention will be obvious to those skilled in the art from reading the present detailed description and from the attached illustrative drawings.

SUMMARY OF THE INVENTION

The Applicant has found that these and further aims are achieved by a method for determining the geometrical dimensions of a wheel, in particular a vehicle wheel, or at least one part of a wheel, comprising the step of moving at least one sensor device for scanning at least one part of the surface of the wheel, along a trajectory lying in at least one plane which is perpendicular to a central axis of the wheel.

The method of the present invention further comprises the step of determining the geometrical dimensions of the at least one part of the scanned surface of the wheel as a function of the position of the at least one sensor device with respect to a fixed reference, and is characterized in that the at least one sensor device comprises a radar system.

According to one embodiment, the radar system operates at frequencies between 300 MHz and 300 GHz.

According to one embodiment, the radar system is a millimeter-wave radar system and operates at frequencies between 30 GHz and 300 GHz. According to a preferred embodiment, the millimeter-wave radar system operates at frequencies between 76 GHz and 81 GHz.

According to one embodiment, at least one portion of the trajectory of the at least one sensor device comprises a rotation about an axis of rotation that is substantially parallel to the central axis of the wheel.

According to one embodiment, at least one portion of the trajectory of the at least one sensor device comprises a translation in the at least one plane that is perpendicular to the central axis of the wheel.

According to one embodiment, at least one portion of the trajectory of the at least one sensor device comprises both a rotation about an axis of rotation that is substantially parallel to the central axis of the wheel, and a translation in the at least one plane that is perpendicular to the central axis of the wheel.

According to another embodiment, at least one portion of the trajectory of the at least one sensor device lies in at least two planes that are perpendicular to the central axis of the wheel. In other words, the at least one portion of the trajectory of the at least one sensor device is in this case oblique, or at an angle, to the at least one plane that is perpendicular to the central axis of the wheel.

According to one embodiment, the position of the at least one sensor device with respect to the fixed reference is detected by measuring the acceleration of the at least one sensor device in at least two predetermined directions, which are preferably orthogonal, as it moves.

According to one preferred embodiment, the position of the at least one sensor device with respect to the fixed reference is detected by measuring the acceleration of the at least one sensor device in three predetermined directions, which are preferably orthogonal, as it moves.

According to one embodiment, the method of the present invention comprises the step of determining at least one part of a profile of a sidewall and/or of a tread of a tire of the wheel.

According to one embodiment, the method of the present invention comprises the step of determining at least one part of a profile of a rim of the wheel. In particular, according to a preferred variant of this embodiment, the method of the present invention comprises the step of determining at least one part of the profile of at least one spoke of the rim of the wheel.

According to one embodiment, the method of the present invention comprises the step of determining at least one width of the wheel, preferably of a wheel bearing a tire, or of the assembly made up of the rim and the tire mounted thereon.

According to one embodiment, the method of the present invention comprises the step of determining at least one width of a rim of the wheel.

The present invention also relates to an apparatus for determining the geometrical dimensions of a wheel, in particular a vehicle wheel, or at least one part of a wheel, comprising a frame having a shaft for mounting the wheel and means for movably supporting a support element on the frame of the apparatus. The apparatus further comprises at least one sensor device mounted on the support element for scanning at least one part of the surface of the wheel, and a measurement device for measuring the position of the sensor device, with respect to a reference integral with the frame, as it moves along a trajectory lying in at least one plane perpendicular to a central axis of the wheel.

The apparatus further comprises processing means for determining the geometrical dimensions of the at least one part of the scanned surface of the wheel as a function of the position of the support element, and is characterized in that the at least one sensor device comprises a radar system.

According to one embodiment, the radar system of the apparatus operates at frequencies between 300 MHz and 300 GHz.

According to one embodiment, this radar system is a millimeter-wave radar system and operates at frequencies between 30 GHz and 300 GHz. According to a preferred embodiment, the millimeter-wave radar system operates at frequencies between 76 GHz and 81 GHz.

According to one embodiment, the measurement device of the apparatus includes accelerometer means capable of measuring the acceleration of the at least one sensor device in at least two predetermined directions, preferably in three predetermined directions, said at least two or three predetermined directions preferably being orthogonal, and moreover the processing means of the apparatus can determine, from the acceleration measured, the position, with respect to the reference integral with the frame, of the at least one sensor device as it moves.

According to one embodiment, the accelerometer means are mounted on the support element. According to a preferred variant of this embodiment, the accelerometer means are rigidly connected to the at least one sensor device. According to a further preferred variant, the accelerometer means and the at least one sensor device are integrated in a single measurement unit.

According to one embodiment, the means for movably supporting the support element on the frame of the apparatus comprise a bearing for rotatably supporting the support element about an axis of rotation substantially parallel to the central axis of the wheel. According to a preferred variant of this embodiment, the measurement device is capable of measuring the angular position of the support element, and therefore of the sensor device, as it rotates about the axis of rotation of the bearing.

The present invention may advantageously be incorporated in various wheel maintenance machines, for example it may be implemented in a tire changer or in a wheel balancer.

Preferably, the sensor device may be mounted rigidly secured to a wheel protection device (also known as a wheel guard), which is generally arranged so as to rotate about an axis parallel to the axis of rotation of the wheel, or, according to certain embodiments, it is designed to slide or pivot/slide ("space-saving" solutions).

According to the invention, the sensor device can automatically and contactlessly acquire the width of the rim or of the tire-bearing wheel.

Preferably, the sensor device of the present invention can obtain a scan of the profile of the sidewall of the wheel as the wheel guard moves.

Preferably, the sensor device of the present invention may be used to obtain information on the runout of the wheel and/or to check that the wheel mounted on the shaft of the wheel maintenance machine is centered.

Preferably, the sensor device of the present invention may be used to count the spokes of the rim of the wheel undergoing maintenance.

BRIEF DESCRIPTION OF THE DRAWINGS

A detailed description of the present invention will be provided herein below with reference to the attached drawings which are provided solely by way of non-limiting example and in which.

DETAILED DESCRIPTION OF PREFERRED EMBODIMENTS OF THE INVENTION

Figure 1:
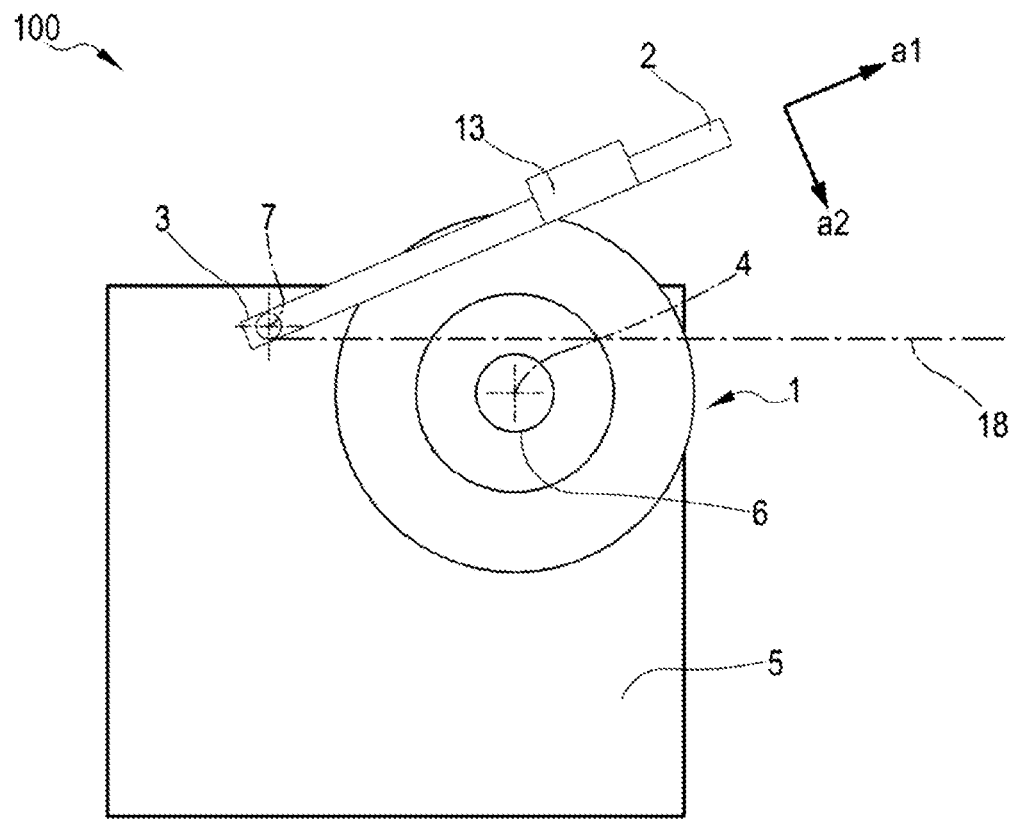
FIG. 1 schematically shows an embodiment of the invention.

In the description below, any expressions used, such as "right-hand", "left-hand", "above", "below", "upper", "lower", "horizontal", "vertical" and the like, are used merely for illustrative purposes and refer to the particular arrangement of the elements present in the attached figures and therefore are not limiting in any way.

With reference to the attached figures, 100 denotes overall a wheel maintenance machine, in particular for vehicle wheels in the form of a rim or in the form of a rim/tire assembly.

The machine 100 comprises a frame 5 having a shaft 6 on which the wheel 1 may be mounted along with a bearing 3 for rotatably supporting a support element 2, for example a wheel guard, on the frame 5 of the machine.

An axis 4 of the shaft 6 and an axis of rotation 7 of the bearing 3 are substantially parallel to one another. The wheel 1 is mounted on the shaft 6 in such a way that the axis of the wheel, or central axis, and the axis 4 of the shaft 6 are coaxial.

At least one sensor device 8 is mounted on the support element 2 for scanning and analyzing the surface of the wheel or at least one part of the surface of the wheel. Two sensor devices wherein the support element may be configured as disclosed in EP 0 358 496 A2 may be provided for analyzing the surfaces of the wheel on both sides. A further sensor device, also mounted on the support element 2 or on the frame 5, for scanning and analyzing the width of the wheel, for example the width of the rim or of the tread of the tire, may also be provided.

A measurement device 9 measures the positions of the support element 2 and/or of the sensor device 8, with respect to a fixed reference that is integral with the frame 5, during movement (of the support element 2 and/or of the sensor device 8) along a trajectory lying in at least one plane perpendicular to the central axis 4 of the wheel 1.

In the embodiment shown in FIG. 1, because the movement of the support element 2, and therefore of the sensor device 8, takes the form of a rotation about the axis of rotation 7, the measurement device 9 can measure the angular positions of the sensor device 8.

Figure 2:
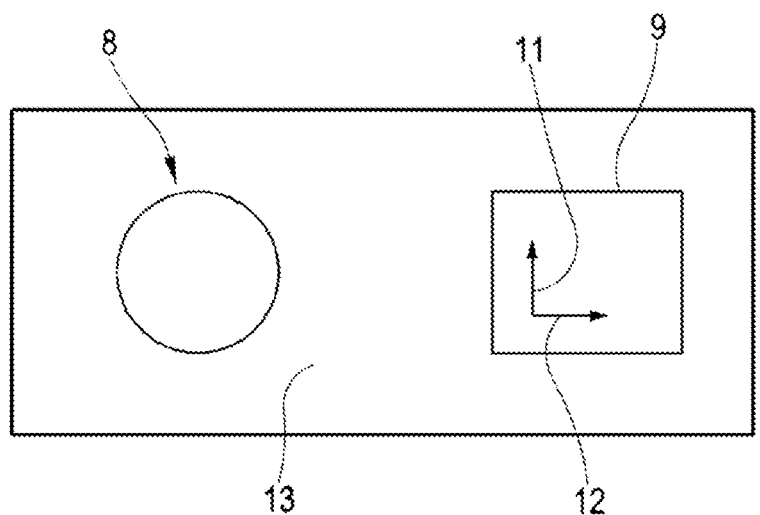
FIG. 2 shows a first example of a measurement unit which may be included in the embodiment of FIG. 1.

The measurement device 9 may be incorporated in a measurement unit 13, as will be explained below with reference to FIG. 2.

Figure 4:
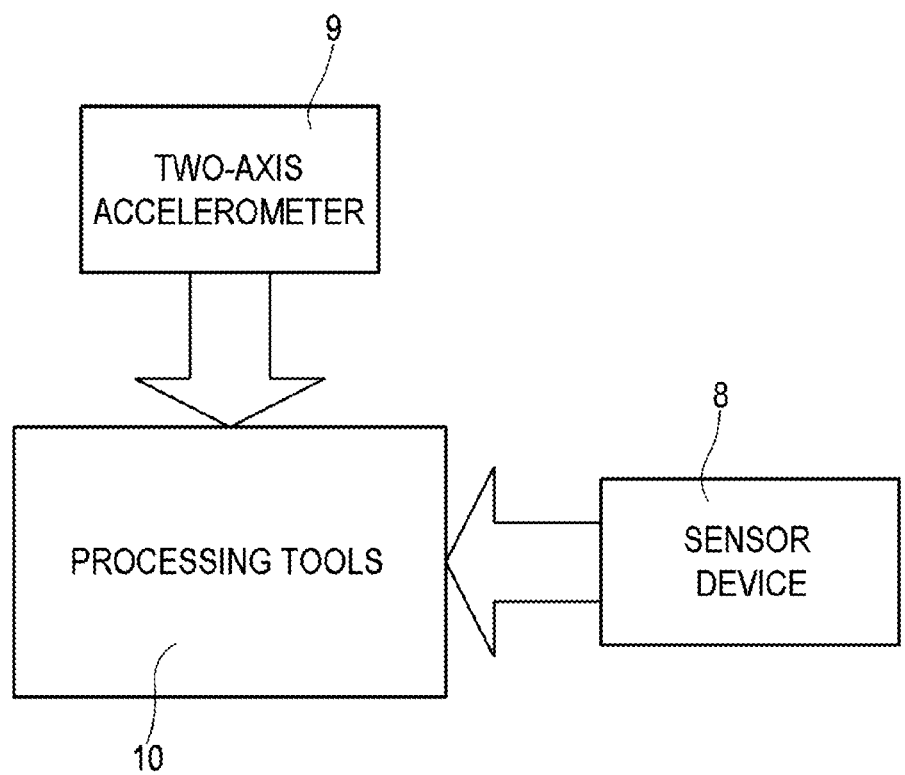
FIG. 4 shows a block diagram illustrating the interaction between the components included in the embodiment of FIG. 1.

The processing means 10 (FIG. 4) determine the geometrical dimensions of the surface of the wheel as a function of the angle of rotation measured.

The measurement device 9 comprises (FIG. 2) accelerometer means 11, 12 capable of measuring the acceleration of the at least one sensor device 8 in at least two predetermined directions a1 and a2, and the processing means 10 are designed to determine, on the basis of the acceleration measured, the angular positions of the at least one sensor device 8 as it rotates.

The accelerometer means 11, 12 can detect information in at least two orthogonal directions, especially in a radial direction of the rotational movement of the sensor device 8 and in a direction at right angles thereto.

Preferably, the means 11, 12 are configured as a dual-axis accelerometer.

The accelerometer means 11, 12 are rigidly connected to the sensor device 8 and are moved together with the latter. Preferably, the sensor device 8 and the measurement device 9 which includes the accelerometer means 11, 12 are integrated in a single measurement unit 13, as shown in FIG. 2.

The accelerometer means 11, 12 and the sensor device 8, which may be integrated in the measurement unit 13, are mounted on the support element 2.

The oscillating or rotary part of the support element 2 rotates, during the scan of the wheel 1, about the axis 7 supported by the bearing 3.

The sensor device 8 may detect the distance between it and the analyzed surface region of the wheel 1.

The sensor device 8 may be configured in the form of a radar system, preferably a millimeter-wave (or mmWave) radar system.

The term millimeter-wave refers to the spectrum of radio waves with frequencies between 30 and 300 GHz, or with a wavelength ranging between 1 and 10 millimeters.

Preferably, the radar system of the present invention operates at frequencies between 76 and 81 GHz, corresponding to a wavelength of around 4 mm.

A complete mmWave radar system comprises radiofrequency (RF) transmitter (Tx) and receiver (Rx) components, analog components, such as a clock oscillator and digital components, such as analog/digital convertors (ADC), microcontrollers (MCU) and digital signal processors (DSP).

These components, including the antenna, may be miniaturized and incorporated in a single chip, and are available from a number of manufacturers; for example, see the families of mmWave sensors under the names IWRx and AWRx supplied by the company Texas Instruments Incorporated.

The wheel maintenance machine 100, shown schematically in FIG. 1, may be a wheel balancer or a tire changer in which the wheel 1 may be mounted on the shaft 6 in a vertical arrangement, as shown in FIG. 1, or in a substantially horizontal arrangement.

Figure 3:
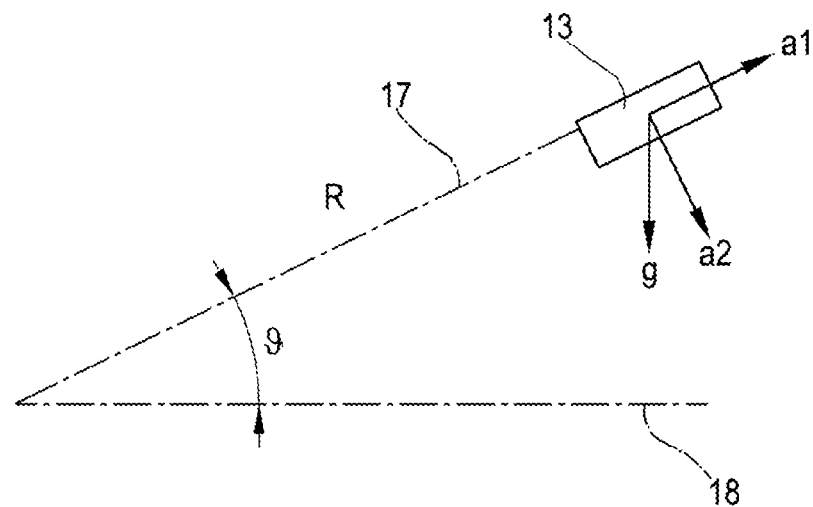
FIG. 3 shows a diagram explaining the operation of the embodiment of FIG. 1.

The embodiment proceeds as follows: the rotational movement of the support element 2 for scanning and analyzing the wheel starts from a predetermined angular position which may be defined on the frame 5 of the machine by means of a suitable rest member. In a wheel balancer, the initial position may be defined by the upper position of the support element 2 shown in FIG. 1, which corresponds to the angular position 17 of FIG. 3. During the scan, the sensor device 8 and the accelerometer means 11, 12 are moved and rotated into the second final position 18 (FIGS. 1 and 3) along an angular rotation path θ about the fixed axis of rotation 7.

During the measurement of the distance of the sensor device 8, the accelerometer means 11, 12 of the measurement device 9 simultaneously read the angular acceleration of the sensor device 8 and, with the aid of the processing means 10 (FIG. 4), the respective angular positions and, optionally, the speed of the sensor device 8 are determined.

In the embodiment of FIG. 1, the axes a1 of the accelerometer means extends in the radial direction of the rotational movement, and the second axis a2 extends at right angles (tangentially) thereto. The axes a1 and a2 extend in a plane in which the sensor device 8 and the accelerometer means 11, 12 are rotated during the scan of the wheel, or in a plane parallel thereto.

The processing means 10 assess the data measured according to the following system of equations:

The radial (or normal centripetal) acceleration is obtained from:

$$a_N = \omega^2 R$$

The tangential acceleration is obtained from:

$$a_T = R\frac{d\omega}{dt} = R\alpha$$

In which θ is the angular position of the support element, $$\omega = \frac{d\theta}{dt}$$

is its angular speed, $$\alpha = \frac{d\omega}{dt}$$

is its angular acceleration, and R is the radius of curvature or the length of the support element.

The problem of determining the actual readings of the angular speed and angular acceleration of the profile of the wheel (rim and/or tire), from the readings of the axes of the accelerometer a1 and a2, is described by the following system of equations:

$$\begin{cases} a_1 = a_N - g\sin\theta = \omega^2 R - g\sin\theta \\ a_2 = a_T + g\cos\theta = R\frac{d\omega}{dt} + g\cos\theta = R\alpha + g\cos\theta \end{cases}$$

In which θ is the angular position of the support element, $$\omega = \frac{d\theta}{dt}$$

is its angular speed, $$\alpha = \frac{d\omega}{dt}$$

is its angular acceleration, R is the radius of curvature or the length of the support element, and g is standard gravity (nominal acceleration due to gravity at the surface of the Earth at sea level) and is considered to be 9.80665 m/s².

In order to determine the angular position and/or the angular speed, the system of equations may be solved, for example, using numerical methods such as relaxation methods or the like.

On the basis of the distance data measured by the sensor device 8 and the angular positions associated therewith measured by the accelerometer means 11, 12, the processing means 10 determine the required geometrical dimensions of the scanned surface of the wheel.

Naturally, other embodiments, in which the movement of the support element 2 is not rotational but is a translational or pivot/sliding movement, are possible. It is also possible for the support element 2 to move not only along a trajectory in a single plane perpendicular to the central axis of the wheel, but along a more complex trajectory, in various planes, for example along a trajectory at an angle.

| List of references | |
|---|---|
| 100 | wheel maintenance machine |
| 1 | wheel |
| 2 | support element |
| 3 | means for movably supporting the support element |
| 4 | central axis of the wheel |
| 5 | frame |
| 6 | shaft |
| 7 | axis of rotation |
| 8 | sensor device |
| 9 | measurement device |
| 10 | processing means |
| 11, 12 | accelerometer means |
| 13 | measurement unit |
| 17 | initial angular position |
| 18 | final angular position |

The invention claimed is:

1. A method for determining geometrical dimensions of a wheel, in particular a vehicle wheel, or at least one part of a wheel, comprising the steps of:
    providing a wheel maintenance apparatus comprising a frame having a shaft and means for movably supporting a support element on the frame of the apparatus, wherein the apparatus further comprises:
    at least one sensor device mounted on the support element for scanning at least one part of a surface of the wheel; and
    a measurement device for measuring the position of the sensor device, with respect to a reference integral with the frame, as it moves along a trajectory lying in at least one plane perpendicular to a central axis of the wheel;
    mounting the wheel to the shaft of the wheel maintenance apparatus;
    moving the at least one sensor device for scanning the at least one part of the surface of the wheel, along the trajectory lying in the at least one plane which is perpendicular to the central axis of the wheel; and
    determining the geometrical dimensions of the at least one part of the scanned surface of the wheel as a function of the position of the at least one sensor device with respect to the reference integral with the frame,
    wherein the at least one sensor device comprises a radar system.

2. The method as claimed in claim 1, wherein the radar system operates at frequencies between 300 MHz and 300 GHz.

3. The method as claimed in claim 2, wherein the radar system is a millimeter-wave radar system and operates at frequencies between 30 GHz and 300 GHz, preferably between 76 GHz and 81 GHz.

4. The method as claimed in claim 1, wherein at least one portion of the trajectory of the at least one sensor device comprises a rotation about an axis of rotation that is substantially parallel to the central axis of the wheel.

5. The method as claimed in claim 1, wherein at least one portion of the trajectory of the at least one sensor device comprises a translation in the at least one plane that is perpendicular to the central axis of the wheel.

6. The method as claimed in claim 1, wherein at least one portion of the trajectory of the at least one sensor device lies in at least two planes that are perpendicular to the central axis of the wheel.

7. The method as claimed in claim 1, wherein the position of the at least one sensor device with respect to the reference is detected by measuring the acceleration of the at least one sensor device in two predetermined directions, which are preferably orthogonal, as it moves.

8. The method as claimed in claim 1, comprising the step of determining at least one part of a profile of a sidewall and/or of a tread of a tire of the wheel.

9. The method as claimed in claim 1, comprising the step of determining at least one part of a profile of a rim of the wheel.

10. The method as claimed in claim 9, comprising the step of determining at least one part of the profile of at least one spoke of the rim of the wheel.

11. The method as claimed in claim 1, comprising the step of determining at least one width of the wheel.

12. An apparatus for determining the geometrical dimensions of a wheel, in particular a vehicle wheel, or at least one part of a wheel, comprising:
a frame having a shaft for mounting the wheel and means for movably supporting a support element on the frame of the apparatus;
at least one sensor device mounted on the support element for scanning at least one part of a surface of the wheel;
a measurement device for measuring the position of the support element, with respect to a reference, as it moves along a trajectory lying in at least one plane perpendicular to a central axis of the wheel; and
processing means for determining the geometrical dimensions of the at least one part of the scanned surface of the wheel as a function of the position of the support element,
wherein the at least one sensor device comprises a radar system.

13. The apparatus as claimed in claim 12, wherein the radar system operates at frequencies between 300 MHz and 300 GHz.

14. The apparatus as claimed in claim 13, wherein the radar system is a millimeter-wave radar system and operates at frequencies between 30 GHz and 300 GHz, preferably between 76 GHz and 81 GHz.

15. The apparatus as claimed in claim 12, wherein the measurement device includes accelerometer means capable of measuring the acceleration of the at least one sensor device in two predetermined directions, which are preferably orthogonal, and wherein the processing means can determine, from the acceleration measured, the position, with respect to the reference, of the at least one sensor device as it moves.

16. The apparatus as claimed in claim 15, wherein the accelerometer means are mounted on the support element.

17. The apparatus as claimed in claim 16, wherein the accelerometer means are rigidly connected to the at least one sensor device.

18. The apparatus as claimed in claim 17, wherein the accelerometer means and the at least one sensor device are integrated in a single measurement unit.

19. The apparatus as claimed in claim 16, wherein the means for movably supporting the support element on the frame comprise a bearing for rotatably supporting the support element about an axis of rotation substantially parallel to the central axis of the wheel.

20. The apparatus as claimed in claim 19, wherein the measurement device is capable of measuring the angular position of the support element as it rotates about the axis of rotation of the bearing.

\* \* \* \* \*